United States Patent
Ma et al.

(10) Patent No.: US 8,171,333 B2
(45) Date of Patent: May 1, 2012

(54) SUB-BEAM FORMING TRANSMITTER CIRCUITRY FOR ULTRASOUND SYSTEM

(75) Inventors: Wei Ma, San Ramon, CA (US); Zhenyong Zhang, Sunnyvale, CA (US); Jian-yi Wu, San Ramon, CA (US)

(73) Assignee: Texas Instruments Incorporated, Dallas, TX (US)

( * ) Notice: Subject to any disclaimer, the term of this patent is extended or adjusted under 35 U.S.C. 154(b) by 475 days.

(21) Appl. No.: 12/503,438

(22) Filed: Jul. 15, 2009

(65) Prior Publication Data

US 2011/0012662 A1    Jan. 20, 2011

(51) Int. Cl.
G06F 1/00       (2006.01)
G03B 42/06      (2006.01)

(52) U.S. Cl. .................. 713/500; 713/600; 367/137

(58) Field of Classification Search .......... 713/500, 713/600; 367/137
See application file for complete search history.

(56) References Cited

U.S. PATENT DOCUMENTS

| | | | |
|---|---|---|---|
| 5,186,175 A * | 2/1993 | Hirama et al. | 600/447 |
| 5,410,516 A * | 4/1995 | Uhlendorf et al. | 367/7 |
| 5,544,128 A * | 8/1996 | Kim et al. | 367/119 |
| 5,675,554 A * | 10/1997 | Cole et al. | 367/138 |
| 5,908,391 A | 6/1999 | Muzilla et al. | |
| 6,222,795 B1 * | 4/2001 | Hossack et al. | 367/138 |
| 6,292,435 B1 * | 9/2001 | Savord et al. | 367/138 |
| 6,469,957 B1 * | 10/2002 | Savord et al. | 367/137 |
| 2006/0119223 A1 * | 6/2006 | Ossmann | 310/334 |
| 2007/0242567 A1 | 10/2007 | Daft et al. | |
| 2009/0326375 A1 * | 12/2009 | Magee | 600/443 |

FOREIGN PATENT DOCUMENTS

| | | |
|---|---|---|
| KR | 10-2001-0067091 | 7/2001 |
| KR | 10-2004-0004842 | 1/2004 |

OTHER PUBLICATIONS

International Search Report for PCT Application No. PCT/US2010/042066, 3 pages.
Written Opinion for PCT Application No. PCT/US2010/042066, 3 pages.

* cited by examiner

*Primary Examiner* — Chun Cao
(74) *Attorney, Agent, or Firm* — Wade J. Brady, III; Frederick J. Telecky, Jr.

(57) ABSTRACT

Multi-channel pulser driver circuitry for a sub-beam forming transmitter of an ultrasound system in which sub-beam signals are formed by delaying sub-beam pulse pattern data in accordance with sub-beam pulse delay data and multiple clock signals.

24 Claims, 5 Drawing Sheets

SUB-BEAM FORMING TRANSMITTER CIRCUITRY FOR ULTRASOUND SYSTEM

BACKGROUND

The present invention relates to transmitter circuitry for an ultrasound system, and, in particular, to circuitry for providing sub-beam formed transmit signals for an ultrasound system.

Referring to FIG. 1, a conventional ultrasound system includes a processor/controller 10 and analog front end (AFE) 20, as well as a user interface (not shown), such as a video display and computer keyboard and mouse. Included within the processor/controller 10 is a digital beam former 12 which provide multiple digital transmit data signals 13 defining the transmitted beam profile, and receives, in return, multiple digital receive data signals 33 representing the received energy profile. Any desired beam forming is performed within the beam former circuitry 12.

The transmission path of the AFE 20 includes multiple channels of digital-to-analog conversion (DAC) circuitry 22 and multiple transducer amplifier driver circuits 24. The transmit data signals 13 are converted to corresponding analog signals 23 for driving the driver circuits 24. Each of the resulting driver output signals 25 drives a respective transducer within the transducer array 28, and is conveyed via a transmit/receive switch 26, in accordance with well-known principles.

In accordance with further well known principles, reflected ultrasound energy received by the transducer array 28 is converted to corresponding analog electrical signals 27 which are conveyed via the transmit/receive switch 26 to respective time variable gain amplifier (TVGA) circuits 30. The resulting amplified signals 31 are converted by multiple channels of analog-to-digital conversion (ADC) circuitry 32 to produce the receive data signals 33.

Such ultrasound imaging systems operate in this manner to provide beam forming necessary for the desired image resolution and quality. As noted, the beam forming functions are typically implemented in the digital domain to achieve the desired flexibility and programmability. However, the power consumed by such digital domain circuitry has been increasing as speed and complexity of the processing increase. Such power consumption, and particularly any increases in power consumption, is particularly problematic as more systems are designed to be portable and operate under battery power. Additionally, as more complex transducer arrays are developed, the number of signals 13, 33 in the interface between the processor/controller 10 and AFE 20 have increased. Accordingly, it would be desirable to implement improved sub-beam forming so as to reduce power consumption and the number of signal connections between the processor/controller 10 and AFE 20.

SUMMARY

Multi-channel pulser driver circuitry for a sub-beam forming transmitter of an ultrasound system is provided in which sub-beam signals are formed by delaying sub-beam pulse pattern data in accordance with sub-beam pulse delay data and multiple clock signals.

In accordance with one embodiment of the presently claimed invention, multi-channel pulser driver circuitry for a sub-beam forming transmitter of an ultrasound system includes:

pulse control circuitry to provide a plurality of sub-beam pulse control signals including a plurality of sub-beam pulse pattern data, a plurality of sub-beam pulse delay data and a plurality of clock signals; and signal pulse generating circuitry coupled to the pulse control circuitry and responsive to the pluralities of sub-beam pulse pattern data, sub-beam pulse delay data and clock signals by providing a plurality of serial sub-beam signal pulses, wherein one or more respective ones of the plurality of sub-beam serial signal pulses correspond to at least a portion of the plurality of sub-beam pulse pattern data and are time delayed in relation to the pluralities of sub-beam pulse delay data and clock signals.

In accordance with another embodiment of the presently claimed invention, multi-channel pulser driver circuitry for a sub-beam forming transmitter of an ultrasound system includes:

clock selection circuitry responsive to a first portion of a plurality of sub-beam pulse delay data and a plurality of clock signals by providing a selected one of the plurality of clock signals;

delay circuitry coupled to the clock selection circuitry and responsive to a second portion of the plurality of sub-beam pulse delay data and the selected one of the plurality of clock signals by providing a delayed clock signal corresponding to and temporally delayed in relation to the selected one of the plurality of clock signals; and data storage circuitry coupled to the delay circuitry and responsive to a plurality of sub-beam pulse pattern data and the delayed clock signal by storing the plurality of sub-beam pulse pattern data and retrieving respective portions of the stored plurality of sub-beam pulse pattern data in accordance with the delayed clock signal.

In accordance with another embodiment of the presently claimed invention, multi-channel pulser driver circuitry for a sub-beam forming transmitter of an ultrasound system includes:

pulse controller means for providing a plurality of sub-beam pulse control signals including a plurality of sub-beam pulse pattern data, a plurality of sub-beam pulse delay data and a plurality of clock signals; and signal pulse generator means for receiving the pluralities of sub-beam pulse pattern data, sub-beam pulse delay data and clock signals and in response thereto providing a plurality of serial sub-beam signal pulses, wherein one or more respective ones of the plurality of sub-beam serial signal pulses correspond to at least a portion of the plurality of sub-beam pulse pattern data and are time delayed in relation to the pluralities of sub-beam pulse delay data and clock signals.

In accordance with another embodiment of the presently claimed invention, multi-channel pulser driver circuitry for a sub-beam forming transmitter of an ultrasound system includes:

clock selector means for receiving a first portion of a plurality of sub-beam pulse delay data and in response thereto selecting among a plurality of clock signals to provide a selected one of the plurality of clock signals;

delay means for receiving a second portion of the plurality of sub-beam pulse delay data and in response thereto delaying the selected one of the plurality of clock signals to provide a delayed clock signal corresponding to and temporally delayed in relation to the selected one of the plurality of clock signals; and data storage means for receiving a plurality of sub-beam pulse pattern data and the delayed clock signal and in response thereto storing the plurality of sub-beam pulse pattern data and retrieving respective portions of the stored plurality of sub-beam pulse pattern data in accordance with the delayed clock signal.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry. Thus, for example, one or more of the functional blocks (e.g., processors, memories, etc.) may be implemented in a single piece of hardware (e.g., a general purpose signal processor, random access memory, hard disk drive, etc.). Similarly, any programs described may be standalone programs, may be incorporated as subroutines in an operating system, may be functions in an installed software package, etc.

Figure 1:
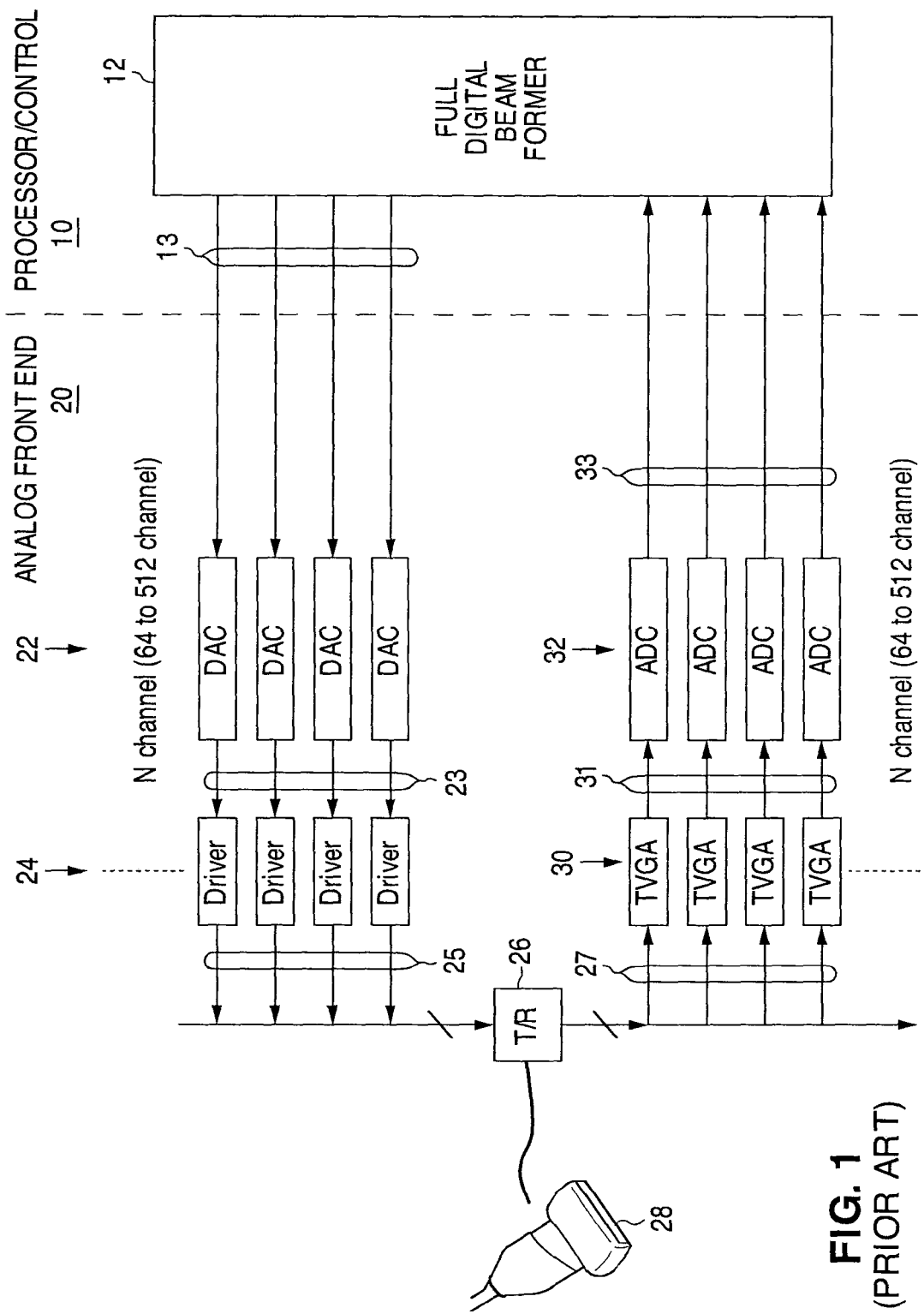
FIG. 1 is a functional block diagram of the transmit and receive channels of a conventional beam forming ultrasound system.
Figure 2:
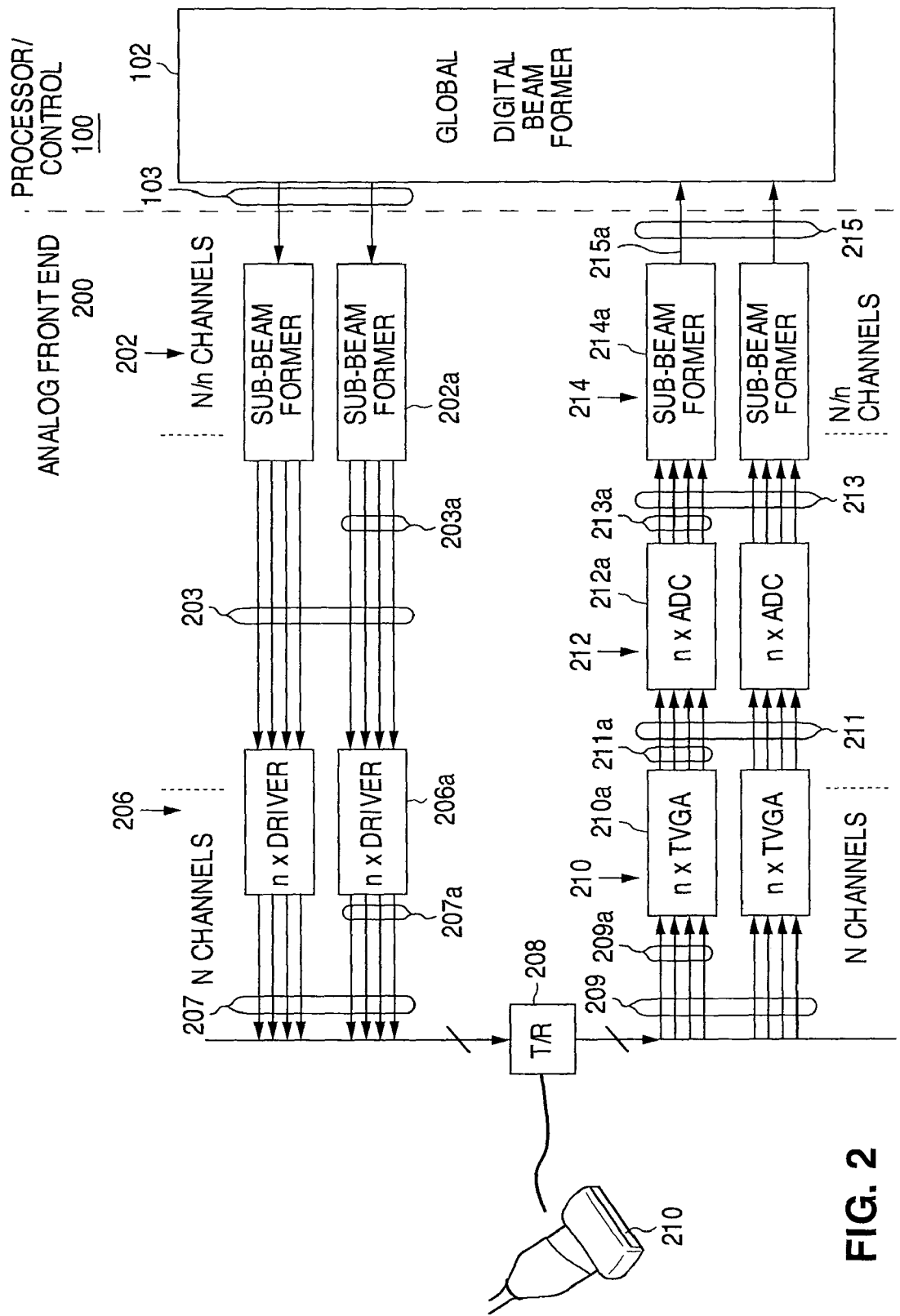
FIG. 2 is a functional block diagram of transmit and receive channels of an ultrasound system implementing sub-beam forming in accordance with one or more embodiments of the presently claimed invention.

Referring to FIG. 2, an ultrasound system employing sub-beam forming in accordance with one or more embodiments of the presently claimed invention simplifies the signal interface between the global digital beam former circuitry of the processor/controller 100 and the AFE 200. The global digital beam former 102 divides the total number N of channels into many smaller groups of n channels, or "sub-beams", which provide multiple sub-beams of transmit data signals 103 and receive multiple sub-beams of receive data signals 215. In the transmit path, these N/n data signals 103 are used to provide N sub-beam signals 203 by N/n sub-beam former circuits 202a. (For example, if the transducer array 210 is driven by N=256 signals, and each sub-beam former circuit 202 provides n=8 sub-beam signals, then the global digital beam former 102 only needs to provide N/n=32 transmit data signals 103.) The sub-beam signals 203 serve as analog drive signals for the driver circuits 206, which provide the drive signals 207 for the transducer array.

The receive signals 209 from the transducer array 210 are amplified by time variable gain amplifiers 210, and the resulting amplified signals 211 are converted by ADC circuits 212 to produce corresponding digital signals 213. These digital signals 213 are processed by sub-beam forming receiver circuits 214 (the subject matter of which is disclosed and one or more embodiments of which are claimed in a co-pending patent application) to provide the N/n receive data signals 215.

Such sub-beam forming in accordance with one or more embodiments of the presently claimed invention reduces overall system complexity and power consumption. For example, whereas conventional beam forming is performed in the digital domain, e.g., using a field programmable gate array (FPGA), e.g., as part of the global digital beam former 102, with a large number of interpolation computations consuming significant power, sub-beam forming in accordance with one or more embodiments of the presently claimed invention is performed in analog and mixed signal domains to achieve high accuracy while consuming less power.

Figure 3:
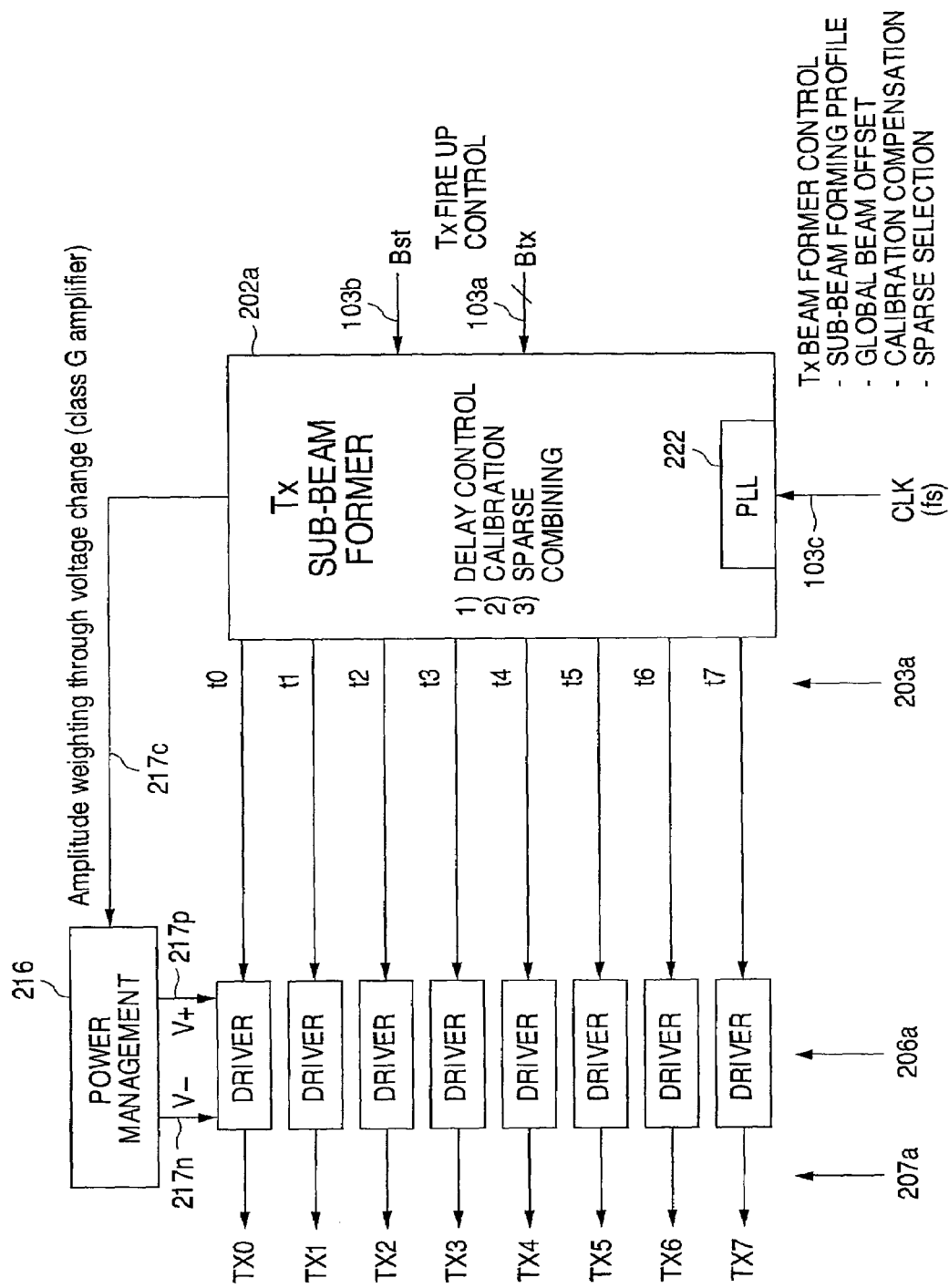
FIG. 3 is a functional block diagram of eight channels of an ultrasound system having a sub-beam forming transmitter in accordance with one or more embodiments of the presently claimed invention.

Referring to FIG. 3, in accordance with one or more embodiments of the presently claimed invention, sub-beam forming is performed in the transmit signal path. Each sub-beam former circuit 202a in the transmit signal path of the AFE 200 (FIG. 2) receives transmit beam form control signals 103a, 103b, including sub-beam forming profile data, global beam offset data, calibration compensation data, sparse selection data and transmit initiation, or "fire up," control data, as well as a clock signal 103c. The clock signal 103c drives a phase locked loop (PLL) circuit 222, which provides various clock signals having different frequencies and phases, as needed.

The sub-beam former circuit 202a receives beam forming requirements as defined by the sub-beam forming profile data signal Btx 103a, and converts them to multiple waveforms t0, t1, . . . , t7 203a with programmable signal amplitudes and time delays. For example, a waveform with a signal duration of 200 ns can be pre-stored in the sub-beam former circuit 202a, and the sub-beam forming profile data specify that the waveforms be successively delayed by 1 ns and reduced in amplitude by one percent. As a result, following assertion of the fire up signal Bst 103b, the sub-beam former circuit 202a will provide the eight signals 203a such that $t1(n)=0.99*t0(n-1\ ns)$, $t2(n)=0.98*t0(n-2\ ns), \ldots, t7(n)=0.93*t0(n-7\ ns)$. Alternatively, modifications to the signal amplitudes can be done in the driver circuits 206a, e.g., in accordance with programmable positive 217p and negative 217n power supply voltages (discussed in more detail below).

As noted above, the sub-beam formed signals 203a drive the driver circuits 206a, which provide the drive signals 207a for their respective transducers (as discussed above). The sub-beam former circuitry 202a provides one or more control signals 217c to power management circuitry 216 for the drive circuits 206a. In accordance with these one or more control signals 217c, the power management circuitry 216 controls positive 217p and negative 217n power supply voltages for the driver circuits 206a. For example, in accordance with a preferred embodiment, the driver circuits 206a use class G amplifiers for which their power supply voltages 217p, 217n are controlled by the power management circuitry 216, thereby providing amplitude control for the transducer drive signals 207a. Alternatively, the driver circuits 206a can be implemented in the form of simple pulse generators, multi-level pulse generators, or other classes of amplifiers (e.g., class A/B).

Fine phase control necessary to form a precise beam shape requires timing that is either finer than the pulse rate or has more phases in each cycle. For example, if 40 Ms/sec. (mega samples per second) is used to generate a pulse waveform, the sample time resolution is 25 ns (nanoseconds), which is not normally sufficient. Accordingly, 40 MHz is needed to synchronize a higher frequency, such as 160 MHz, to generate finer clock cycle shifts of 6.25 ns. As discussed in more detail below, coarse delay control can be used to delay signals 203a in increments of 6.25 ns. For fine delays, a multi-phase clock signal can be used. For example, with m=8 phases, the fine time resolution will be ⅛ of one clock cycle, or 0.78125 ns.

With the sub-beam former 202a operating at sufficiently high frequency, it can be operated to provide multiple pulses to implement a pulse width modulation (PWM) function to generate arbitrary waveforms, or code excited pulses to provide more energy to the ultrasound target.

Calibration can be provided within the sub-beam former 202a to improve control efficiency and allow for signal losses through the signal paths to the transducers. Such calibration can include calibration for time delays and amplitude variations. For example, operating differences will always exist to some degree among the various transducers, driver amplifiers and other circuit elements (both active and passive). The calibration process (e.g., as part of manufacturing test) can include capturing these differences and converting them to offset data for storage within the sub-beam former 202a, thereby allowing adjustments to be made to the beam profile based on these offset data to provide more accurate beam forming performance.

Additionally, sparse beam forming can be provided by driving subsets of transducers, such as even or odd or individually selected transducers. For example, as part of the beam profile forming, the amplitudes for selected ones of the various waveforms produced can be defined as zero (or some other predetermined low value).

Figure 4:
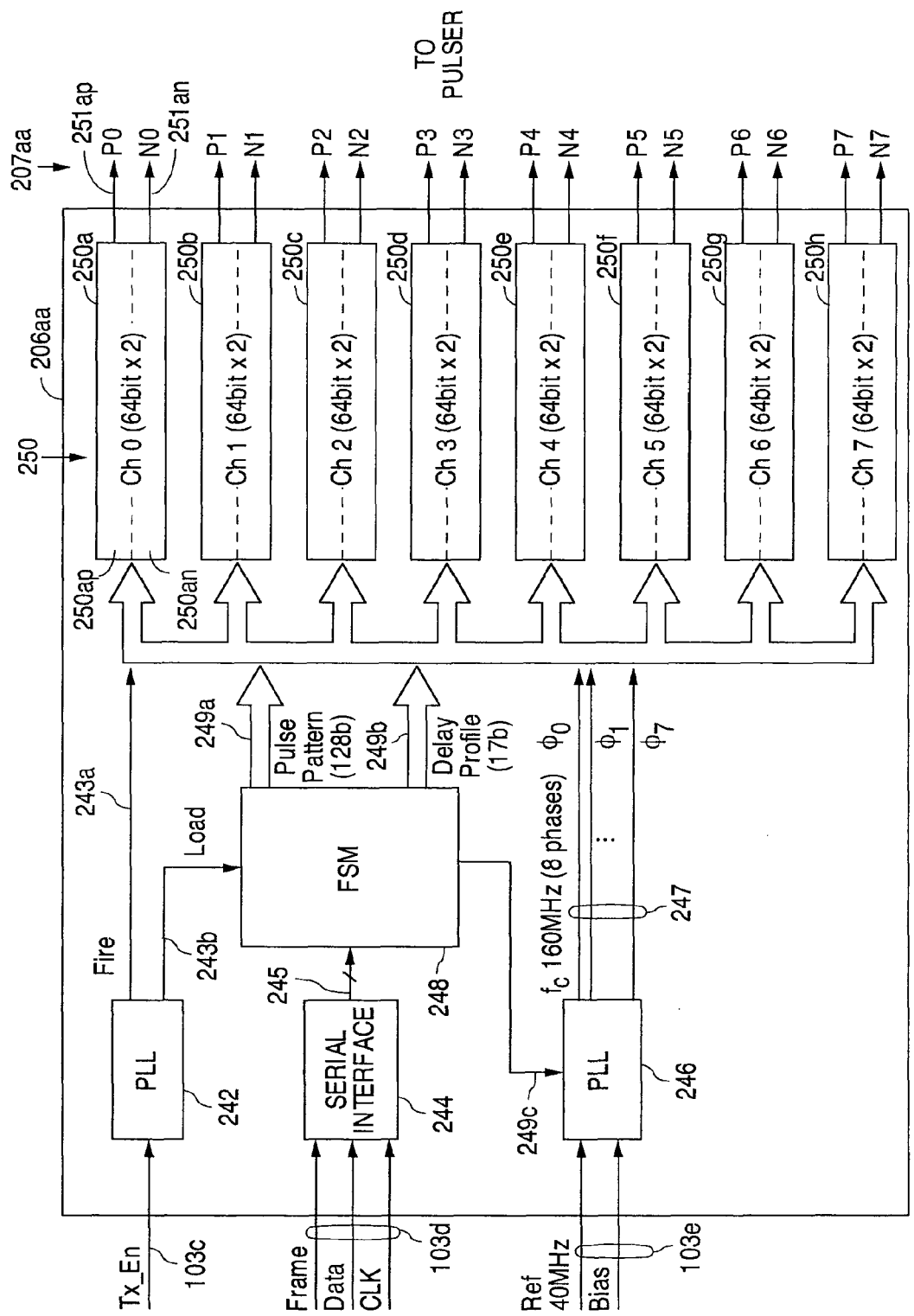
FIG. 4 is a functional block diagram of a driver circuit for a signal pulser for driving an ultrasound transducer in accordance with one or more embodiments of the presently claimed invention.

Referring to FIG. 4, in accordance with one or more embodiments of the presently claimed invention, the driver circuit 206aa can be implemented using two-level drivers or pulse generators (pulsers), substantially as shown. Firing control circuitry 242, in accordance with a transmit enable signal 103c, provides a start control signal 243a to provide pulse signals through eight pairs of shift register channels 250, and a load control signal 243b for a finite state machine (FSM) 248 which provides control and converts incoming data into the proper format. Serial interface circuitry 244 receives pulse and control data and a corresponding clock signal 103d, and converts the serial data to parallel data 245 to be loaded into the FSM 248. The FSM 248 provides pulse pattern data 249a (e.g., 128 bits) and delay profile data 249b (e.g., 17 bits) for the data channels 250, and a control signal 249c for a PLL circuit 246.

The PLL circuit 246 receives reference and bias signals 103e, and generates a multi-phase clock signal 247 at the over sampling frequency fc (e.g., 160 MHz with eight phases in an exemplary embodiment).

The data channels 250 receive the pulse pattern 249a and delay profile 249b data, and are controlled by the fire control signal 243a and selected phases of the multi-phase clock signal 247 (discussed in more detail below). Each data channel 250 provides two output bits P (P0, P1, P2, . . . ,P7), N (N0, N1, N2, . . . , N7) for the pulser driver circuit driving its respective transducer. These two bits allow four levels of pulser control, three of which are used when driving bipolar pulsers. For example, these four levels can be defined as follows: Pn=0 and Nn=0 for an output voltage of zero; Pn=1 and Nn=0 for most positive pulse voltage; Pn=0 and Nn=1 for most negative pulse voltage; and Pn=1 and Nn=1 for damped pulse echo. Each pair of signals Pn, Nn can be delayed with equal timing; however, the eight signal pairs P0/N0, P1/N1, . . . , P7/N7 are generally delayed by different timing intervals in accordance with beam forming requirements as discussed above (e.g., signal pair P1/N1 delayed by 1.5 ns relative to signal pair P0/N0).

In accordance with a preferred embodiment, each data channel 250 provides up to 64 pulses for each control bit P, N, thereby allowing for PWM or code excited multi-pulse signals. The PLL circuit 246 provides the multi-phase clock signal 247 at an over sampling frequency of fc=160 MHz. With eight phases, a fine delay of 0.7825 ns is provided. The serial interface 244 allows different delay profile data to be received and loaded into the FSM 248 for different beam patterns. The transmit enable signal 103c allows all data channels 250 to be fired simultaneously. Calibration can be provided by storing calibration data within the FSM 248 or within dedicated memory (not shown).

Figure 5:
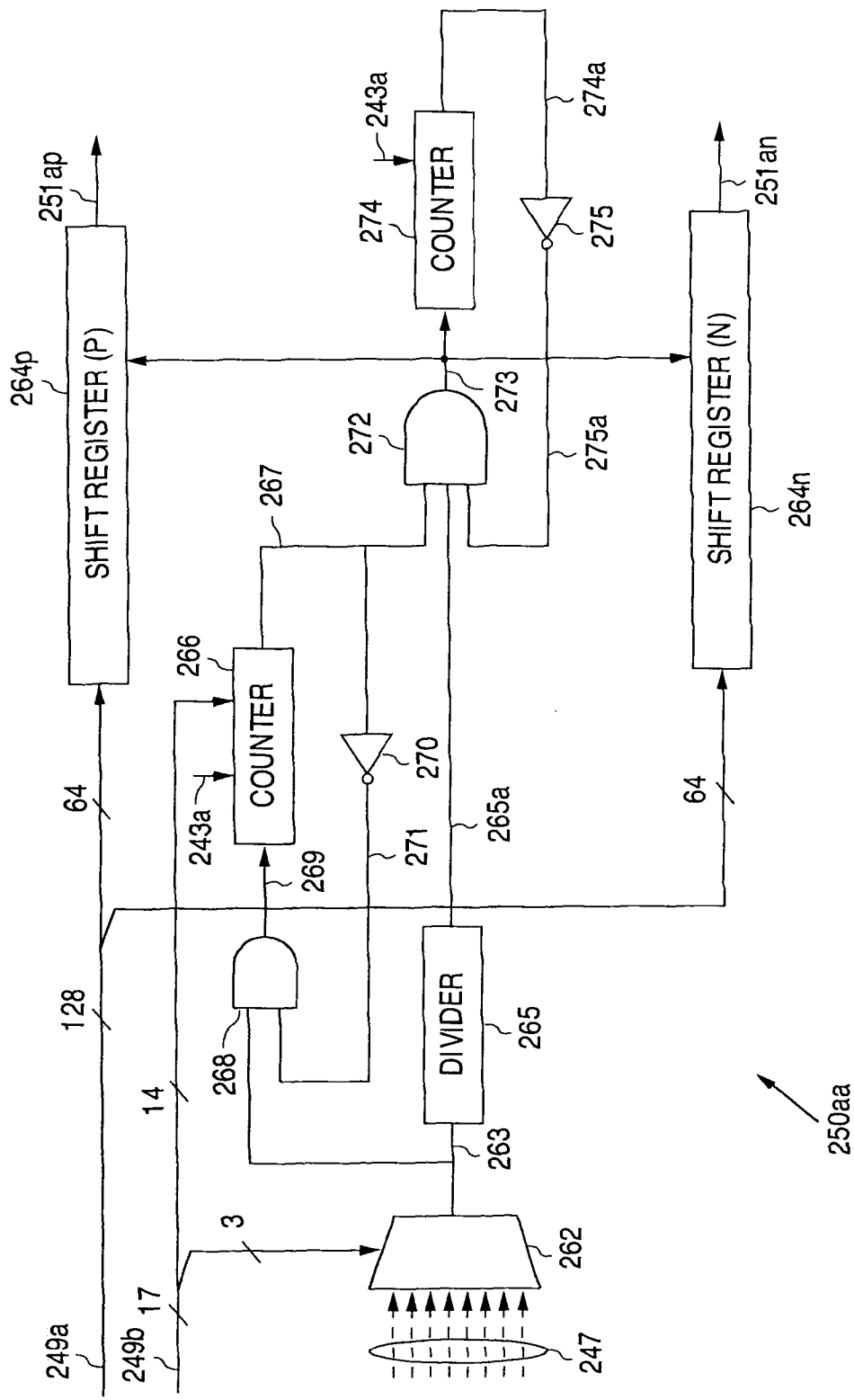
FIG. 5 is a functional block diagram of an exemplary embodiment of one of the pulse driver channels of the circuitry of FIG. 4.

Referring to FIG. 5, an exemplary embodiment 250aa of one of the data channels 250 includes a multiplexer 262, shift registers 264p, 264n, a counter 266, and logic circuitry 268, 270, 272, all interconnected substantially as shown. The pulse pattern data 249a are split between and loaded into the shift registers 264p, 264n. The delay profile data 249b provides control bits to the multiplexer 262 for selecting one of the phases of the multi-phase clock signal 247 (e.g., three bits for selecting among eight phases), and bits (e.g., 14) for loading the counter 266. Accordingly, the counter 266 controls the coarse delay, while the multiphase clock signal 247 controls the fine delay. The selected clock signal phase 263 drives the counter 266 as well as the programmable divider 265. The divider 265 scales the clock 263 to a lower frequency clock 265a controlled by a preloaded scaling factor for the programmable pulse firing frequency. The counter 266 output 267 is kept at a logic "0" before each firing, controlled by a "fire" control signal 243a. Following assertion of the "fire" control signal 243a, the counter 266 starts counting. After the coarse delay interval as determined by the loaded counter data has passed, the asserted terminal count output 267 enables the divided clock 265a to pass via the AND gate 272 as the clock signal 273 for the shift registers 264p, 264n. (When the counter 266 reaches the coarse delay value, the input AND gate 268 and feedback inverter 270 disable the counter clock 269, keeping the counter 266 output terminal asserted until the "fire" control signal 243a is de-asserted). Accordingly, at the end of the delay interval defined by the coarse and fine delays, the control bits 251ap, 251an for the pulser are clocked out by the enabled clock signal 273 in accordance with the bit patterns loaded into the shift registers 264p, 264n. Another counter 274 counts fired pulses. When it reaches the predetermined length, its terminal count output 274a is asserted, thereby disabling the clock signal 273 through the inverter 275 and the AND gate 272. (Its control strategy is similar to that of the first counter 266.) The terminal count output 274a is kept de-asserted before each firing, controlled by "fire" control signal 243a. After each firing, the shift registers 264p, 264n will automatically be set to their pre-loaded values in preparation for the next firing.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including multi-channel pulser driver circuitry for a sub-beam forming transmitter of an ultrasound system, comprising:
    pulse control circuitry to provide a plurality of sub-beam pulse control signals including a plurality of sub-beam pulse pattern data, a plurality of sub-beam pulse delay data and a plurality of clock signals; and
    signal pulse generating circuitry coupled to said pulse control circuitry and responsive to said pluralities of sub-beam pulse pattern data, sub-beam pulse delay data and clock signals by providing a plurality of serial sub-beam signal pulses, wherein one or more respective ones of said plurality of sub-beam serial signal pulses correspond to at least a portion of said plurality of sub-beam pulse pattern data and are time delayed in relation to said pluralities of sub-beam pulse delay data and clock signals.

2. The apparatus of claim 1, wherein said plurality of clock signals have a common frequency and mutually distinct phases.

3. The apparatus of claim 1, wherein said pulse control circuitry comprises finite state machine (FSM) circuitry to provide a portion of said plurality of sub-beam pulse control signals including said pluralities of sub-beam pulse pattern data and sub-beam pulse delay data.

4. The apparatus of claim 1, wherein said pulse control circuitry comprises phase locked loop (PLL) circuitry to provide a portion of said plurality of sub-beam pulse control signals including said plurality of clock signals.

5. The apparatus of claim 4, wherein said plurality of clock signals have a common frequency and mutually distinct phases.

6. The apparatus of claim 1, wherein said pulse control circuitry comprises:
    finite state machine (FSM) circuitry to provide a portion of said plurality of sub-beam pulse control signals including said pluralities of sub-beam pulse pattern data and sub-beam pulse delay data, and a clock control signal; and
    phase locked loop (PLL) circuitry coupled to said FSM circuitry and responsive to said clock control signal by providing another portion of said plurality of sub-beam pulse control signals including said plurality of clock signals.

7. The apparatus of claim 6, wherein said plurality of clock signals have a common frequency and mutually distinct phases.

8. The apparatus of claim 1, wherein said signal pulse generating circuitry comprises:
    clock selection circuitry responsive to a first portion of said plurality of sub-beam pulse delay data and said plurality of clock signals by providing a selected one of said plurality of clock signals;
    delay circuitry coupled to said clock selection circuitry and responsive to a second portion of said plurality of sub-beam pulse delay data and said selected one of said plurality of clock signals by providing a delayed clock signal corresponding to and temporally delayed in relation to said selected one of said plurality of clock signals; and
    data storage circuitry coupled to said delay circuitry and responsive to said plurality of sub-beam pulse pattern data and said delayed clock signal by storing said plurality of sub-beam pulse pattern data and retrieving respective portions of said stored plurality of sub-beam pulse pattern data in accordance with said delayed clock signal.

9. The apparatus of claim 8, wherein said delayed clock signal is temporally delayed in relation to said selected one of said plurality of clock signals in accordance with:
    a first delay related to said first portion of said plurality of sub-beam pulse delay data; and
    a second delay related to said second portion of said plurality of sub-beam pulse delay data.

10. The apparatus of claim 8, wherein said first delay is less than said second delay.

11. The apparatus of claim 8, wherein said clock selection circuitry comprises multiplexor circuitry.

12. The apparatus of claim 8, wherein said delay circuitry comprises counter circuitry.

13. The apparatus of claim 8, wherein:
    said data storage circuitry comprises
        first shift register circuitry responsive to said delayed clock signal by retrieving first respective portions of said stored plurality of sub-beam pulse pattern data in accordance with said delayed clock signal, and
        second shift register circuitry responsive to said delayed clock signal by retrieving second respective portions of said stored plurality of sub-beam pulse pattern data in accordance with said delayed clock signal; and
    said retrieved first and second respective portions of said stored plurality of sub-beam pulse pattern data provide a sequence of two-bit data signals in accordance with said delayed clock signal.

14. An apparatus including multi-channel pulser driver circuitry for a sub-beam forming transmitter of an ultrasound system, comprising:
    clock selection circuitry responsive to a first portion of a plurality of sub-beam pulse delay data and a plurality of clock signals by providing a selected one of said plurality of clock signals;
    delay circuitry coupled to said clock selection circuitry and responsive to a second portion of said plurality of sub-beam pulse delay data and said selected one of said plurality of clock signals by providing a delayed clock signal corresponding to and temporally delayed in relation to said selected one of said plurality of clock signals; and
    data storage circuitry coupled to said delay circuitry and responsive to a plurality of sub-beam pulse pattern data and said delayed clock signal by storing said plurality of sub-beam pulse pattern data and retrieving respective portions of said stored plurality of sub-beam pulse pattern data in accordance with said delayed clock signal.

15. The apparatus of claim 14, wherein said plurality of clock signals have a common frequency and mutually distinct phases.

16. The apparatus of claim 14, wherein said delayed clock signal is temporally delayed in relation to said selected one of said plurality of clock signals in accordance with:
- a first delay related to said first portion of said plurality of sub-beam pulse delay data; and
- a second delay related to said second portion of said plurality of sub-beam pulse delay data.

17. The apparatus of claim 14, wherein said first delay is less than said second delay.

18. The apparatus of claim 14, wherein said clock selection circuitry comprises multiplexor circuitry.

19. The apparatus of claim 14, wherein said delay circuitry comprises counter circuitry.

20. The apparatus of claim 14, wherein:
- said data storage circuitry comprises
  - first shift register circuitry responsive to said delayed clock signal by retrieving first respective portions of said stored plurality of sub-beam pulse pattern data in accordance with said delayed clock signal, and
  - second shift register circuitry responsive to said delayed clock signal by retrieving second respective portions of said stored plurality of sub-beam pulse pattern data in accordance with said delayed clock signal; and
- said retrieved first and second respective portions of said stored plurality of sub-beam pulse pattern data provide a sequence of two-bit data signals in accordance with said delayed clock signal.

21. An apparatus including multi-channel pulser driver circuitry for a sub-beam forming transmitter of an ultrasound system, comprising:
- pulse controller means for providing a plurality of sub-beam pulse control signals including a plurality of sub-beam pulse pattern data, a plurality of sub-beam pulse delay data and a plurality of clock signals; and
- signal pulse generator means for receiving said pluralities of sub-beam pulse pattern data, sub-beam pulse delay data and clock signals and in response thereto providing a plurality of serial sub-beam signal pulses, wherein one or more respective ones of said plurality of sub-beam serial signal pulses correspond to at least a portion of said plurality of sub-beam pulse pattern data and are time delayed in relation to said pluralities of sub-beam pulse delay data and clock signals.

22. The apparatus of claim 21, wherein said plurality of clock signals have a common frequency and mutually distinct phases.

23. An apparatus including multi-channel pulser driver circuitry for a sub-beam forming transmitter of an ultrasound system, comprising:
- clock selector means for receiving a first portion of a plurality of sub-beam pulse delay data and in response thereto selecting among a plurality of clock signals to provide a selected one of said plurality of clock signals;
- delay means for receiving a second portion of said plurality of sub-beam pulse delay data and in response thereto delaying said selected one of said plurality of clock signals to provide a delayed clock signal corresponding to and temporally delayed in relation to said selected one of said plurality of clock signals; and
- data storage means for receiving a plurality of sub-beam pulse pattern data and said delayed clock signal and in response thereto storing said plurality of sub-beam pulse pattern data and retrieving respective portions of said stored plurality of sub-beam pulse pattern data in accordance with said delayed clock signal.

24. The apparatus of claim 23, wherein said plurality of clock signals have a common frequency and mutually distinct phases.

* * * * *